United States Patent [19]

Okubo et al.

[11] Patent Number: 4,472,027

[45] Date of Patent: Sep. 18, 1984

[54] METHOD FOR THE ORIENTATION OF LIQUID CRYSTAL AND LIQUID CRYSTAL DISPLAY DEVICE

[75] Inventors: Yukitoshi Okubo, Yokohama; Yoshiyuki Osada, Yokosuka; Masao Sugata, Kawasaki; Takashi Nakagiri, Tokyo, all of Japan

[73] Assignee: Canon Kabushiki Kaisha, Tokyo, Japan

[21] Appl. No.: 330,720

[22] Filed: Dec. 14, 1981

[30] Foreign Application Priority Data

Dec. 25, 1980 [JP] Japan .............................. 55-184638
Jan. 7, 1981 [JP] Japan .............................. 56-001331

[51] Int. Cl.$^3$ .............................................. G02F 1/13
[52] U.S. Cl. ................................ 350/340; 350/339 R
[58] Field of Search .............. 350/340, 339 R; 528/42

[56] References Cited

U.S. PATENT DOCUMENTS

| | | | |
|---|---|---|---|
| 3,809,456 | 5/1974 | Goldmacher et al. | 350/340 |
| 3,854,793 | 12/1974 | Kahn | 350/340 |
| 3,867,015 | 2/1975 | Iida et al. | 350/340 |
| 3,910,682 | 10/1975 | Arai et al. | 350/340 |
| 4,354,740 | 10/1982 | Cole, Jr. | 350/340 |
| 4,357,374 | 11/1982 | Ogawa | 350/340 X |

Primary Examiner—John K. Corbin
Assistant Examiner—Richard F. Gallivan
Attorney, Agent, or Firm—Fitzpatrick, Cella, Harper & Scinto

[57] ABSTRACT

A method for orienting a liquid crystal comprises bringing a liquid crystal into contact with a heat treated surface of an electrode substrate provided with a film formed by coating a silane compound having alkoxy and an organic residue having at least a fluorine-substituted hydrocarbon residue, the heat treatment being effected under vacuum or under the conditions that the heating temperature and the treating time are within the region of a triangle having the vertexes at (1.75, 0), (2.5, 0) and (1.75, 3.7) in a coordinate with 1000 x (x being the reciprocal of absolute temperature) on the abscissa and ln k' on the ordinate where k' is the ratio of 300 min. to the treating time (min.).

Liquid crystal display devices utilize the electrode substrate thus treated.

77 Claims, 10 Drawing Figures

METHOD FOR THE ORIENTATION OF LIQUID CRYSTAL AND LIQUID CRYSTAL DISPLAY DEVICE

BACKGROUND OF THE INVENTION

1. Field of the Invention

The present invention relates to a method for orienting a liquid crystal and a liquid crystal display device, and more particularly, to a method for orienting a liquid crystal appropriate for a liquid crystal display device which is combined with an amorphous silicon function element, and a liquid crystal display device.

2. Description of the Prior Art

Heretofore there have been known display devices having a driving switching element array, for example, an example of the display devices is disclosed in IEEE Transactions on Electron Devices ED-20, p. 995 (1973).

Where a large type of display panel provided with function elements of amorphous silicon (hereinafter referred to as "a-Si") as switching elements is used for utilizing a liquid crystal mode showing a display effect by the orientation substantially perpendicular to the substrate, the following orientation treating conditions should be satisfied.

In particular, orientation methods appropriate for a display device provided with a thin film transistor array having on the surface at least two different functions and at least two different materials should satisfy the following conditions.

(1) When an electric field is applied, the tilting direction is uniform. And substantially homeotropic alignment is obtained.
(2) The a-Si is not affected by heat.
(3) The a-Si is not contaminated with impurities.
(4) Uniform orientation can be effected over a large area.

Furthermore, the orientation treating method should be that which is reliable, inexpensive and appropriate for mass treatment.

Many orientation methods for liquid crystal display devices have been proposed and these orientation methods are all concerned with an action at the interface between the liquid crystal and the electrode substrate. These methods may be roughly classified as shown below.

(1) A method where a substrate surface itself washed with an acid or alkali is used as an active surface.
(2) A method where the surface is treated by a physical method such as rubbing, oblique evaporation deposition, etching and the like.
(3) A method where an orientation agent such as lecithin, various polymers, surfactants and the like is formed as a film.
(4) A method where an orientation agent such as a fatty acid, a surfactant containing a quarternary amine and the like is added to a liquid crystal.

However, conventional orientation methods are not appropriate for the above mentioned large type of display panel haing a-Si function elements as the switching element.

SUMMARY OF THE INVENTION

An object of the present invention is to provide a method for orienting a liquid crystal and liquid crystal display device free from the above mentioned drawbacks.

Another object of the present invention is to provide a method for orienting a liquid crystal suitable for a large type of display panel having a-Si function elements.

A further object of the present invention is to provide a method for orienting liquid crystal by which a liquid crystal is oriented perpendicular to the substrate having an a-Si function element.

Still another object of the present invention is to provide a method for orienting a liquid crystal by which a liquid crystal can be uniformly and stably oriented perpendicular to the substrate having an a-Si function element without deteriorating the performance of the a-Si function element.

A still further object of the present invention is to provide a liquid crystal display device comprising a liquid crystal oriented by the above mentioned method.

According to one aspect of the present invention, there is provided a method for orienting a liquid crystal which comprises bringing a liquid crystal into contact with a heat treated surface of an electrode substrate provided with a film formed by coating a silane compound having alkoxy and an organic residue having at least a fluorine-substituted hydrocarbon residue, the heat treatment being effected under the conditions that the heating temperature and the treating time are within the region of a triangle having the vertexes at (1.75, 0), (2.5, 0) and (1.75, 3.7) in a coordinate with 1000 x (reciprocal of absolute temperature) on the abscissa and ln k' on the ordinate where k' is the ratio of 300 min. to the treating time (min.).

The above-mentioned heat treatment condition is hereinafter called "triangle (1.75, 0), (2,5, 0) and (1.75, 3.7) condition".

According to another aspect of the present invention, there is provided a liquid crystal display device comprising a liquid crystal subjected to the above mentioned orienting method.

DESCRIPTION OF THE PREFERRED EMBODIMENTS

Figure 4:
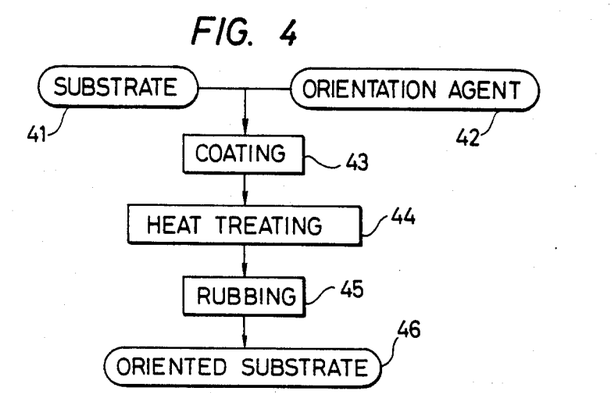
FIG. 4 is a flow chart showing a production of a substrate subjected to an orientation treatment according to the present invention.

The orientation method according to the present invention may be carried out following the flow chart in FIG. 4.

Referring to FIG. 4, an orientation agent 42 composed of a silane compound (infra) is applied to a substrate 41 to be subjected to an orientation treatment at a coating step 43. The substrate thus coated is subjected to a heat treatment in a heat treatment step 44 under the conditions of heating temperature and treating time as mentioned below and, preferably, subjected to a rubbing treatment 45, to produce an orientation treating substrate 46.

In the above-mentioned process, according to the present invention the orientation treatment can be achieved without applying an unnecessary heat load to the substrate and the function element formed on the surface of the substrate. In an embodiment of the present invention, the orientation treatment is applied to a glass substrate having an a-Si semiconductor switching array.

Figure 1A:
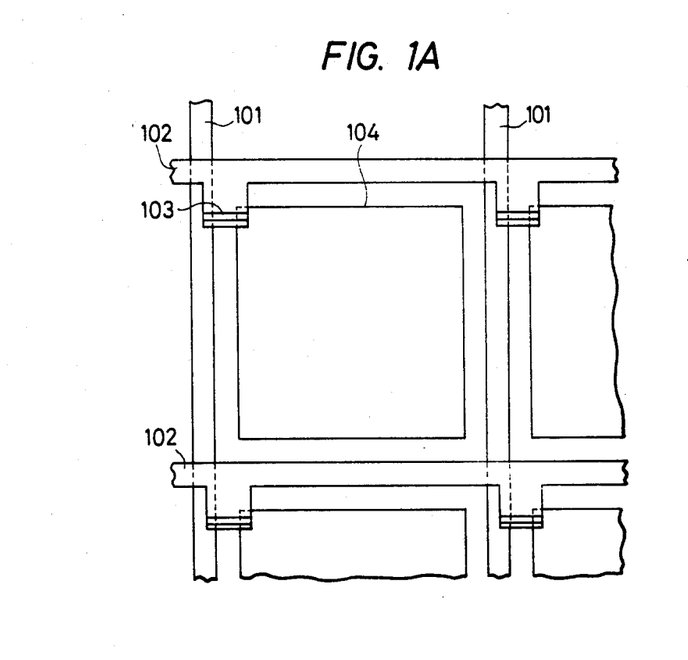
FIG. 1A is a plan view of a part of a substrate provided with a driving switching element array.
Figure 1B:
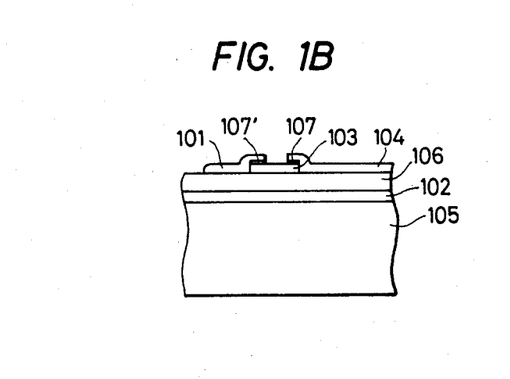
FIG. 1B is a cross sectional view of the substrate illustrated in FIG. 1A.
Figure 2:
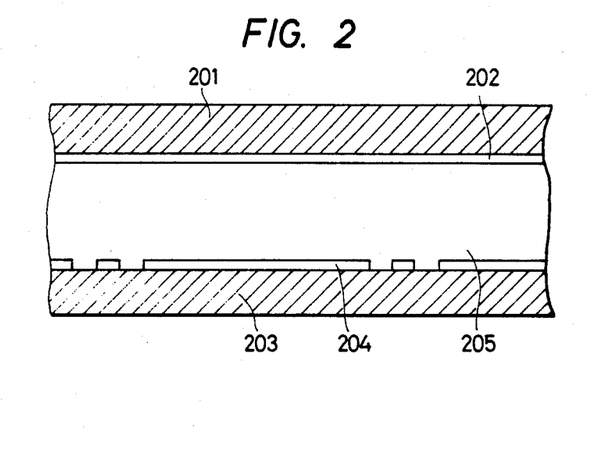
FIG. 2 is a cross sectional view of a display device having a substrate provided with a driving switching element array.

The substrate having the a-Si semiconductor switching array is illustrated in FIG. 1A, FIG. 1B and FIG. 2.

Referring to FIG. 1A, on a substrate are provided a gate line 102, a source line 101, and further a switching element 103 selectively driven by these signal lines and a picture electrode 104 connected to a drain electrode of the switching element.

Referring to FIG. 1B, a cross sectional view of the substrate member of FIG. 1A, there are shown a substrate 105, a gate electrode 102, an insulating layer 106, a picture element 104 connected to a drain electrode of a switching element, a semiconductor 103, n+ layers 107 and 107' and a source electrode 101.

Referring to FIG. 2, a liquid crystal layer 205 as an electro-optical material is sandwiched between a substrate 203 provided with a switching element array 204 and a counter substrate 201 provided with a counter electrode 202.

Figure 3:
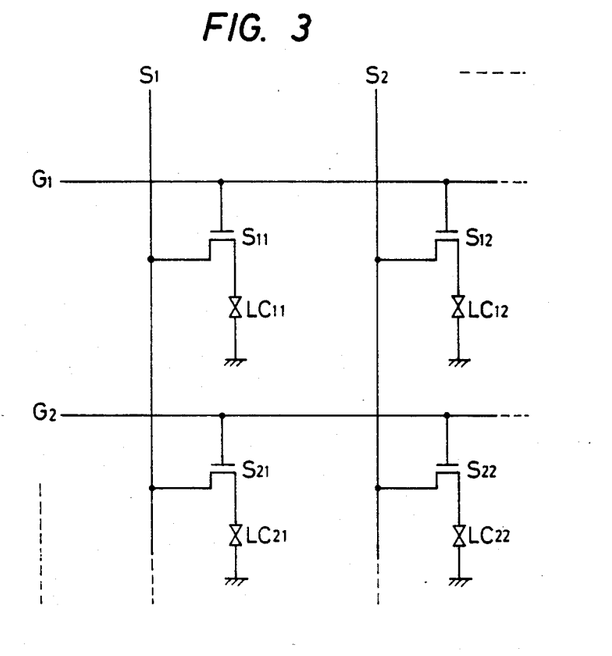
FIG. 3 shows an equivalent circuit of the display device of FIG. 2.

Referring to FIG. 3, an equivalent circuit of the above-mentioned display device is shown. Driving voltages are applied to gate lines $G_1$, $G_2$, ... and image signals are applied to source lines $S_1$, $S_2$, .... When a driving voltage is applied to gate line $G_1$, all the switching elements $S_{11}$, $S_{12}$, ... connected to the gate line $G_1$ become conductive, and image signals are applied to liquid crystal cells $LC_{11}$, $LC_{12}$, .... When the driving voltage is switched to gate line $G_2$, switching elements $S_{11}$, $S_{12}$, ... become non-conductive, and the image signal applied to liquid crystals $LC_{11}$, $LC_{12}$, ... is retained by the electrostatic capacity of the liquid cells themselves and the image signal of the next line, i.e., line $G_2$, is applied to the source line.

Tolerable heat load to the substrate as illustrated in FIG. 1A and FIG. 1B is less than 500° C., preferably less than 300° C., and more preferably less than 200° C. from a viewpoint of safety.

According to the present invention, the orientation agent material is a silane compound having alkoxy and an organic residue having at least a fluorine-substituted hydrocarbon residue, and preferably it is a compound of the formula:

$$CF_3(CF_2)_n—Si(OR)_3 \quad (I)$$

where R is alkyl such as methyl, ethyl and the like and n is an integer of 1–20.

The silane compounds (I) may be used alone or in combination. The compound (I) where R is methyl and n is 3, 4, 5, 6 or 7 is preferred.

The silane compound may be diluted with a fluorine containing solvent to form the 0.1–5% solution and applied to the surface of a substrate by a rotating coating method, soak coating method, brush coating method or the like. After drying the solvent, a heat treatment is applied thereto under the above mentioned conditions, and thereby a liquid crystal contacing this surface can show a homeotropic alignment. Further, the present inventors have found that these silane compounds do not contaminate the semiconductor, but it is preferred to take care that any impurities are not mixed in.

In general, for achieving a highly uniform and highly reliable orientation, the heat treatment should be effected under the conditions that the temperature is higher than 200° C., usually higher than 300° C., and the treating time is from 10 min. to one hour, but when such heat treatment is applied to a substrate provided with an a-Si function element, the function of the a-Si function element is disadvantageously lost. Thus, one feature of the present invention resides in a uniform and highly reliable orientation without losing the function of the a-Si function element.

Even when the silane compound is subjected to a heat treatment at 150° C. for one hour which is outside of the conditions of the present invention, a uniform homeotropic alignment can be obtained. However, such homeotropic alignment of liquid crystal when any voltage is not applied is not sufficient to be practically used as a display device. That is, when a voltage is applied to liquid crystal, the liquid crystal molecules tilt and the tilting directions of the molecules should be the same. Otherwise the display effect is adversely affected when the optical change is observed by a polarizer plate since the resulting contrast becomes irregular.

Figure 5A:
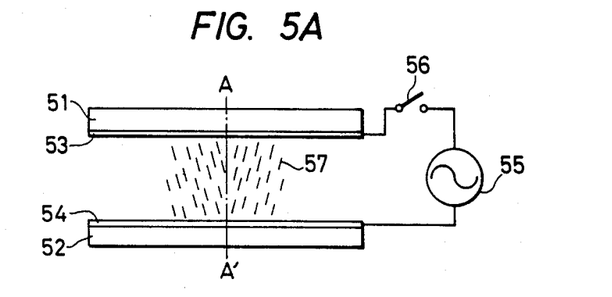
FIG. 5A and FIG. 5B show cross sectional views of a display device using a liquid crystal orienting method other than the present invention.
Figure 5B:
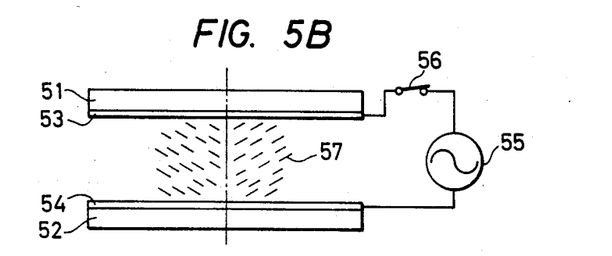

FIG. 5A and FIG. 5B are cross sectional view of a display construction for explaining the above matters. The liquid crystal is sandwiched between a substrate 51 having an electrode 53 and a substrate 52 having an electrode 54, and at least one of the electrodes is transparent. When a homeotropic orientation treatment is applied to the electrode, a liquid crystal 57 substantially results in homeotropic alignment at the surface portion of the electrode.

In the case of a nematic liquid crystal, molecules of the liquid crystal outside of the surface portion of the electrode also tends to align in parallel, and therefore, almost homeotropic alignment is obtained as a whole where the thickness of liquid crystal is from about several $\mu m$ to 50 $\mu m$.

However, the orientation direction is actually slightly tilted, for example, FIG. 5A shows that liquid crystal molecules slightly tilt and the directions of the tilting are different in the both sides of the line A—A'. Where the lead lines connected to electrode 53 and electrode 54 are connected to each other through a power source 55 and a switch 56, in the case of FIG. 5A, the switch is off and a voltage is not applied accross the electrodes. The difference in the tilting direction of the liquid crystal molecules in a state of homeotropic alignment is usually very little and can not be detected by an optical means. However, when switch 56 is on as shown in FIG. 5B, in the case of a liquid crystal of a negative dielectric isotropy (having a dipole moment in the direction perpendicular to the long axis of molecule), the molecules tilt such that molecules in the left side of the line A—A' tilt to the left side while molecules in the right side of the line A—A' tilt to the right side.

Such state of tilting is often observed as an optical nonuniformity in a display device utilizing a polarizer plate or a guest-host display where a dichroic dye is added to a liquid crystal. In particular, when the voltage of the power source 55 is an unsaturated voltage which can not make the liquid crystal molecules tilt completely, this tendency is remarkable.

Such optical nonuniformity is regarded as irregularity or defect of display panels to degrade the display performance.

Therefore, there is required such an initial orientation that the orientation direction is of almost homeotropic alignment when no voltage is applied while the direction tilts to one side as a voltage is applied.

According to the present invention, a surface state where liquid crystal molecules are oriented to a uniform tilting direction is obtained by rubbing a surface treated with one of the above-mentioned compounds to one direction with a cotton cloth. However, when the rubbing is applied to a surface which has been treated at a low temperature, the tilting becomes so much that the resulting contrast is insufficient or the returning to the homeotropic alignment after removal of the applied voltage is so slow, seemingly due to the complete tilting of the molecules, that a memory effect appears, though a uniform tilting can be obtained.

The above phenomenon seem to occur due to the insufficient bonding of the coated orientation agent to the substrate.

The present invention is based on a discovery of a means for solving such drawback by the present inventors. For example, a desired liquid crystal homeotropic aligning substrate is obtained by applying a silane compound of the formula, $CF_3(CF_2)_n—Si—(OCH_3)_3$ where n is 1-20, to the surface of a substrate, heat-treating the resulting substrate under the triangle (1.75, 0) (2.5, 0) and (1.75, 3.7) condition, and rubbing the substrate thus heat-treated to one direction.

According to the present invention as mentioned above, a desired orientation is obtained and a display panel of high reliability and high quality is produced.

The mechanism of the orientation method according to the present invention has not yet been clearly known. However, the mechanism of at least the heat treating condition may be considered as follows. The compound, $CF_3(CF_2)_n—Si—(OCH_3)_3$, as an orientation agent, seems to show a good orientation performance when there is formed a good bonding between the compound and the substrate. An ideally good bonding is considered to be the bonding (b) below. That is, a substrate glass structure having Si—O bonds is present together with a compound having silanol groups derived from the above mentioned compound by hydrolysis of the end groups (State (a)), and the bonding as shown in State (b) is formed by dehydration condensation occurring in State (a).

(a)

(b)

The hydrolyzed structure of the silane compound in (a) above can be easily formed in the presence of air, adsorbed water at the substrate surface, heat or catalysts. On the other hand, the structure similar to glass on the substrate surface is also available on the surface of various metal oxides. Therefore, strictly speaking, the above mentioned reaction might not occur, but anyway it could be considered that the orientation agent intimately adheres to the substrate surface by a chemical reaction such as dehydration condensation and the like.

Assuming that there occurs a first-order reaction where a dehydration reaction or bonding step is a rate-controlling step, the reaction rate constant $k_1$ and the reaction time $t_1$ at a temperature $T_1$ may be represented by the formula, $$k_1(T_1) = (1/t_1) \ln a \qquad (1)$$

where a is the concentration of the silanol at the end of the reaction. Assuming that the concentration is that at which an orientation performance required in the present invention can be obtained, the concentration is deemed as constant.

A similar formula is obtained as shown below with respect to a treating time $t_2$ and a reaction rate constant $k_2$ at another temperature $T_2$.

$$k_2(T_2) = (1/t_2) \ln a \qquad (2)$$

Comparing formulas (1) and (2), the following formula is obtained.

$$k_2 = k_1(t_1/t_2) \qquad (3)$$

Assuming that the rate constant at a time $t_1$ when the reaction is completed at a temperature $T_1$ is 1, the above formula (3) becomes as follows.

$$k_2' = t_1/t_2 \qquad (4)$$

The $k_2'$ is not an actual rate constant, but a relative value.

For a temperature $T_n$ and a treating time $t_n$, the formula is as follows.

$$k_n' = t_1/t_n \tag{5}$$

Figure 6:
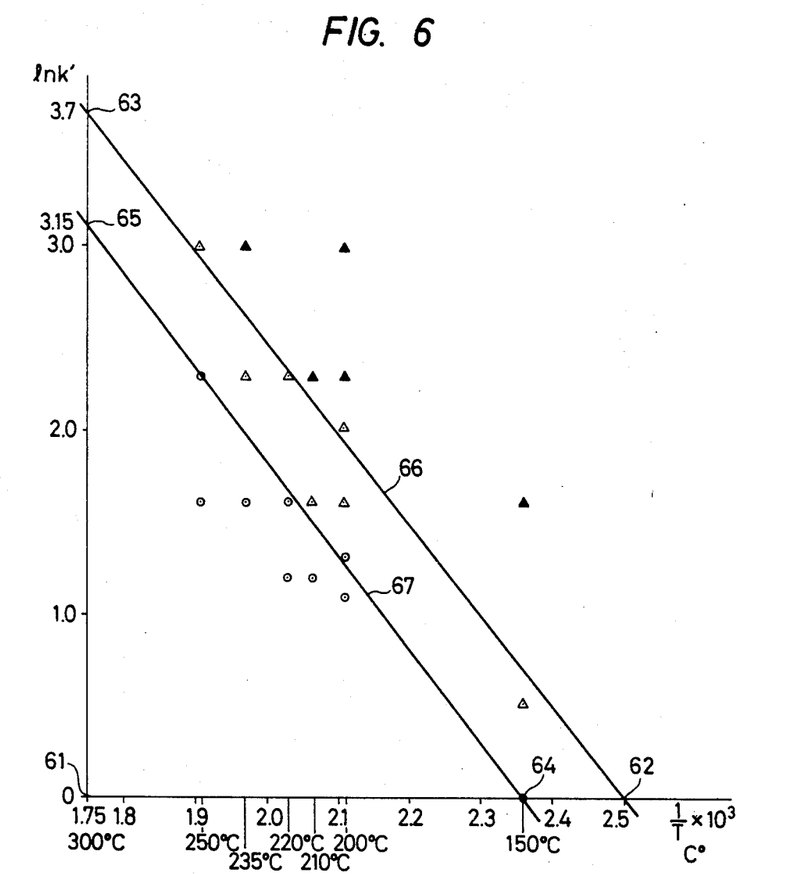
FIG. 6 is a graph showing the relation between the heat treating conditions, that is, a heating temperature and a treating time, and the orientation performance, with $(1/T) \times 10^3$ on the abscissa and with ln k' on the ordinate where T is an absolute temperature.

Referring to FIG. 6, treating conditions together with orientation performance are plotted in a coordinate with a natural logarithm of the relative rate constant on the ordinate and $10^3 \times 1/T$ where T is an absolute temperature on the abscissa.

Evaluation of the orientation performance is indicated by the following symbols in FIG. 6.

O: Good orientation
Δ: Somewhat poor orientation
▲: Insufficient orientation

The above evaluation is a relative one made on the basis of the orientation performance resulting from a good condition, i.e. $t_1 = 300$ min. at 150° C.

As is clear from FIG. 6, good orientation is obtained at a region on the side of point 61 with respect to a line 66 connecting point 62 (2.5, 0) and point 63 (1.75, 3.7). A more preferably region on the side of point 61 with respect oa a line 67 connecting point 64 (2.36, 0) and point 65 (1.75, 3.15). The heat-treatment to the substrate is preferably carried out at a temperature not higher than 300° C. where the substrate is made of glass. In this meaning, a region larger than 1.75 on the abscissa is preferred. A treating time lower than about 300 min. is easy to use so that a region not lower than zero on the ordinate is preferred.

Figure 7:
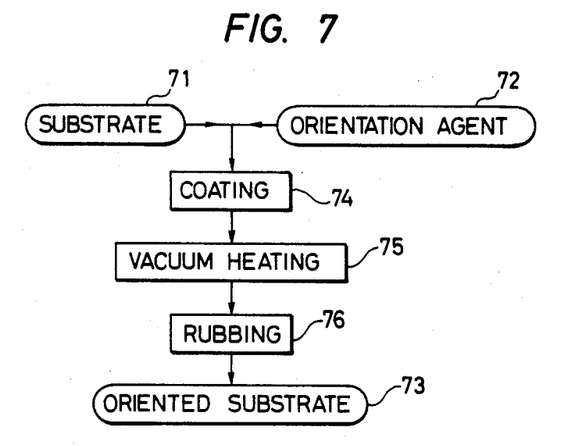
FIG. 7 is a flow chart showing a production of a substrate subjected to an orientation treatment according to the present invention.

Another embodiment of the present invention may be carried out following the flow chart in FIG. 7.

Referring to FIG. 7, a substrate 71 to be subjected to an orientation treatment is coated with an orientation agent 72 at a coating step 74, and the substrate thus coated is heated in vacuo at a step 75 followed by a rubbing step 76 to produce an oriented substrate 73. According to this process of the present invention, the heat-treatment can be carried out within a short time without applying an unnecessary heat load to the substrate and the function element thereon. The process may be applied to a glass substrate provided with a switching array composed of an a-Si semiconductor. The tolarable heat load to the substrate is usually lower than 500° C., preferably lower than 300° C., and more particularly lower than 200° C. for the sake of safety. As an orientation agent applied to the substrate, the silane compounds, in particular, those of formula (I) above, are preferable.

Heat treatment of the orientation agent can be effected at a low temperature for a short time by means of vacuum heating, and the resulting film can impart a good orientation to liquid crystal. Furthermore, vacuum heating has an advantage that the heat treatment is carried out without exposing the metal electrode on the surface of the substrate to an oxidative atmosphere during the heat treatment.

The vacuum heating according to the present invention is preferably carried out under the conditions that the temperatures are from 60° C. to 200° C., the pressures are from $10^{-2}$ mmHg to 10 mmHg, and the treating time is from 10 min. to 3 hours.

The mechanism of the treatment according to the present invention is not yet clear, but it is considered that the alkoxy groups of the orientation agent is thermally decomposed or hydrolyzed and then reacted with hydroxy groups or hydrogen group on the substrate to cause a dehydration condensation resulting in bonding and intimate adhering to the substrate. The resulting film is so strong that, upon a strong rubbing with a cotten cloth, the homeotropic alignment is still retained and moreover, good uniformity of the tilting direction to the rubbing direction can be achieved.

Even when the above mentioned material is coated on a substrate in air and heated a 150° C. for one hour, there can be obtained a uniform homeotropic alignment. However, the resulting display device utilizing homeotropic alignment has some drawbacks.

By "liquid crystal display device utilizing homeotropic alignment", it is meant here a liquid crystal display device in which the liquid crystal molecule axes are aligned in the direction substantially perpendicular to the substrate when a voltage is not applied while the tilting directions are the same when a voltage is applied.

The change of state concerning the molecule axes caused by the applied voltage can be observed by using a polarizer or a dichroic dye dissolved in the liquid crystal, and thus this can be utilized for a display device. When the film of the silane compound of the substrate is heat-treated at 150° C. for one hour as mentioned above can not give a regularity as to the tilting direction of the liquid crystal molecules. As a result, the resulting optical change includes irregular states which deteriorate the display effect.

Even when the surface of the orientation film formed under the above mentioned heating conditions is rubbed with a cotton cloth and the tilting direction becomes uniform, the tilting degree of the molecule axes is too much even at an initial state before a voltage is applied or an irregular memory partly appears when a voltage is applied somewhat and then released since the molecule axes tilt too much. Once such phenomena occur, contrast is lowered and irregular display appears resulting in a display device which is not easy for use.

Though contrast lowering and irregular memory effect by rubbing do not appear when heating conditions are a temperature of higher than 200° C. in air, for example, at 250° C. for about 15 min., a high temperature treatment higher than 200° C. is not desirable for a-Si as mentioned above. In order to heat in air at a temperature lower than 200° C., for example, at 150° C., the heat treatment should be carried out for more than 5 hours, but such heat treatment disadvantageously takes a long time for treatment and the productivity is poor. Further, such heating in air results in other disadvantages, for example, the high temperature treatment and the long time treatment tend to oxidize the metal electrodes for driving the function elements.

Representative examples of the silane compound of the formula (I) above are as shown below:

1. $CF_3(CF_2)_3—Si—(OCH_3)_3$
2. $CF_3(CF_2)_4—Si—(OCH_3)_3$
3. $CF_3(CF_2)_5—Si—(OCH_3)_3$
4. $CF_3(CF_2)_6—Si—(OCH_3)_3$
5. $CF_3(CF_2)_7—Si—(OCH_3)_3$
6. $CF_3(CF_2)_8—Si—(OCH_3)_3$
7. $CF_3(CF_2)_{10}—Si—(OCH_3)_3$

The silane compounds may be used in a diluted form, e.g. a 0.1–5% by weight solution in a fluorinated carbon solvent such as $CF_4$, $C_2F_6$, $C_6F_6$ and the like. Coating the solution on a substrate may be effected by spinner coating, soaking coating, brush coating or the like.

Figure 8:
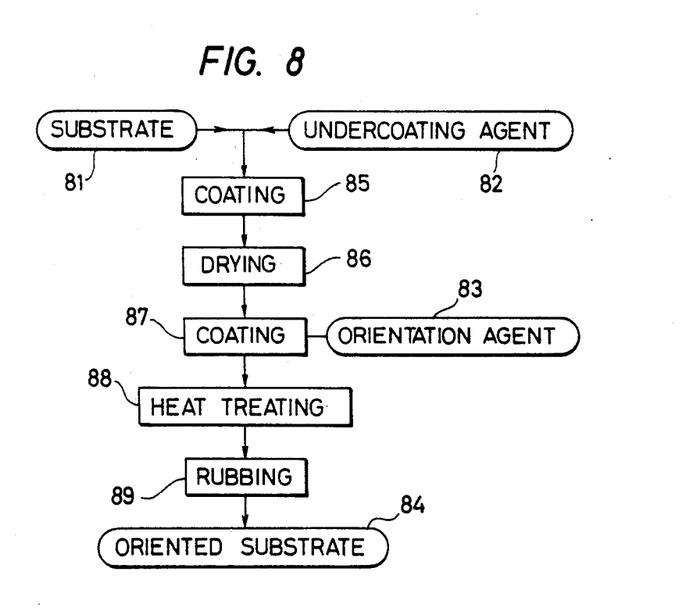
FIG. 8 is a flow chart showing a production of a substrate subjected to an orientation treatment according to the present invention.

A further embodiment of the present invention is illustrated in the flow chart of FIG. 8.

Referring to FIG. 8, a substrate 81 to be subjected to an orientation treatment is coated with an undercoating agent 82 in the coating step 85. Then a drying step 86, a coating step 87 where an orientation agent 83 is applied to the coating formed in the previous step 86, a heat treating step 88 and, if desired, a rubbing step 89 are carried out to produce an oriented substrate 84.

Alternatively, a mixture of the undercoating agent 82 and the orientation agent 83 is coated on the substrate 81 to be subjected to an orientation treatment, dried, and if desired, rubbed to produce an oriented substrate 84. In this process according to the present invention, a good orientation treatment can be completed without adversely affecting the characteristics of a substrate or thin film transistor elements formed on the substrate.

According to an embodiment of the present invention, the orientation treatment may be applied to an a-Si semiconductor thin film transistor array formed on a glass substrate. The tolerable heat load to the substrate is lower than 500° C., preferably 300° C., more preferably 200° C. for the sake of safety. The surface of the transistor array comprises two or more different surfaces of different materials since on the surface of the transistor array are arranged an a-Si material chip concerning switching function, metallic conductive terminals thereof such as source electrode and drain electrode, insulating films composed of silicon nitride or silicon oxide, a glass surface portion used as an under-substrate material and the like. In addition, the substrate surface has uneven surface portions existing between the portions including the above mentioned chips, drain electrodes and source electrodes and the portions including gate electrodes at the lower portion, insulating layers, glass underlayer surfaces and the like. The fine uneven surfaces disturb uniform orientation of liquid crystal.

Figure 9:
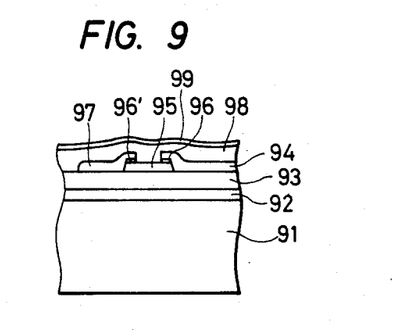
FIG. 9 is a cross sectional view of a substrate subjected to an orientation treatment according to the present invention.

Referring to FIG. 9, an orientation film 99 and an undercoating agent film 98 are formed on the display substrate as illustrated in FIG. 1B. Representative materials used here are: aluminum for a picture element electrode 94 connected to a drain electrode of the switching element and a source electrode 97; a-Si for a semiconductor 95; and silicon nitride or silicon dioxide for an insulating layer 93. Reference numeral 91 denotes a substrate, 92 denotes a gate electrode, and 96 and 96' denote n+layers. For example, where the aluminum is 1000Å-2μ thick and the channel length of the transistor is about 10μ, such fine uneven structure disturbs a uniform orientation necessary to display since the liquid crystal is easily aligned according to the fine uneven structure.

The embodiment according to the present invention can effectively solve the problem caused by the fact that members constituting the surface of a display substrate having a thin film transistor array are made of different materials, and also can satisfy various conditions required. In addition, the present invention can be applied to display devices utilizing a similar technique such as a crystalline silicon or SOS substrate.

As a substrate, there may be used crystalline silicon or sapphire, but the feature of the present invention rather resides in that the whole process of the preparation of thin film transistors can be carried out at a low temperature, and it is effective to use a glass substrate or a plastic film.

As an undercoating agent 92, there may be used alkyl silicate compounds. Representative alkyl silicate compounds are alkyl orthosilicate (monomer), condensates of several molecules of alkyl orthosilicate in a straight chain form or a branched chain form, and the like. Examples of the condensates are tetramer and hexamer of ethyl orthosilicate.

This compound is easily hydrolyzed in the presence of a small amount of an acid in air, a solvent, or on a surface to be treated, or with water added intentionally, and the resulting hydrolysate is coated on the surface to be treated as a film, and then, is fixed to the surface in the form of a "—Si—O—" bonding film by the dehydration condensation. Therefore, when the substrate surface is made of glass, the film directly bonds to Si-OH groups of the glass surface resulting in a strongly fixed film.

On the other hand, a semi-conductor insulating film containing metals or silicon also appears to have a similar effect thereto, and a film of a high adhesion is actually obtained.

In a preferable embodiment of the present invention, the above mentioned compound is hydrolyzed by adding a small amount of an acid and water resulting in the formation of $-Si(OH)_3$, and then the compound thus hydrolyzed is used for coating.

For example, an alkyl silicate compound as above is dissolved in a lower alcohol solvent such as methanol, ethanol, isopropanol and the like to produce a 1-25% solution of the alkyl silicate compound, and 1-5% of water and 0.01-2% of hydrochloric acid are added to the above mentioned solution and allowed to stand for more than 30 minutes. The solution thus allowed to stand is applied to the surface of a substrate by rotation coating, soaking coating or brush coating to form a film on the surface of the substrate. Then, in order to remove unnecessary solvent, the coated film is allowed to stand in room temperature or dried at an optional temperature between room temperature and about 300° C. for 5-60 minutes.

The above-mentioned silane compounds, in particular, the silane compounds of formula (I) above, are, alone or in combination, dissolved in a fluorinated carbon solvent in an amount of 0.1-5% by weight. The resulting solution is applied to the dried film as mentioned above. The application may be effected by spinner, soaking, or brushing. After the solvent is naturally dried, the resulting film is heat-treated at 100-300° C. for from about 10 minutes to 3 hours. The film thus heat-treated is rubbed with a fluffy cotton cloth to one direction to produce an oriented substrate.

A spacer of 4μ-50μ is sandwiched between two oriented substrates. At least one of the oriented substrates is that obtained above. Into the resulting space between the substrates is poured a liquid crystal, and the surrounding is sealed to produce a liquid crystal display cell. When the poured liquid crystal is in a state of homeotropic alignment and has a negative dielectric anisotropy, the direction of the liquid crystal molecules is changed to a direction perpendicular to an electric field applied across the electrodes each of which is provided one each of the two substrates. This change of the direction of liquid crystal molecules can be detected by a dichroic dye or a polarizer, and therefore, this can be utilized as a display means.

According to the above-mentioned treatment of the present invention, there can be obtained a stable and uniform orientation, and the display device utilizing the treatment has a long life and high reliability. These advantages appear to be attributable to the good selection of undercoating agents and orientation agents and the treating procedure according to the present invention.

A silicon oxide film is produced on the surfaces of different materials on the substrate by applying the undercoating agent. The resulting film is a good coating on these different materials and the surface of the film is very appropriate for adhering an orientation agent thereto. This may be due to the similarity between the chemical structures.

In addition, the undercoating agent serves as a clear-coling agent for the above-mentioned fine uneven surface. When the undercoating agent in a liquid form is applied to a substrate, the resulting film covers the fine uneven surface and fills the recesses due to the surface tension and gives a smooth surface. As a result, the adverse effect of the surface shape and structure causing undesirable orientations can be decreased. This permits optional processing on the surface of the substrate.

In addition, such film formation by using a liquid coating material enables to control the concentration easily, and therefore, the resulting film thickness can be easily controlled.

Furthermore, the undercoating agent and the orientation agent can be made into a very strong films by a low temperature treatment. Therefore, the substrate and the semiconductor is not adversely affected by heat.

A still another advantage is that the undercoating agent layer serves as a protective layer which prevents electrochemical changes occurring at the liquid crystal layer over the orientation agent layer or penetrated impurities from adversely affecting the electrodes and semiconductors.

In summary, according to the above mentioned treatment, uniform and stable orientation is obtained, and moreover, a display device utilizing said treatment is of a high reliability and a long life. Processes for producing the display device can be simple, suitable for mass production and the processing cost is low, and therefore, the orientation process and the display device are appropriate for commercial production.

The following examples are given for illustrating the present invention.

EXAMPLES 1-15

A mixture of $CF_3(CF_2)_3—Si—(OCH_3)_3$, $CF_3(CF_2)_4—Si—(OCH_3)_3$, $CF_3(CF_2)_5—Si—(OCH_3)_3$ and $CF_3(CF_2)_6—Si—(OCH_3)_3$ (FS116, tradename, supplied by Daikin Kogyo, Japan) was diluted with a fluorinated carbon solvent, e.g. DAIFLON solvent S-3 (tradename, mainly difluoroethane, supplied by Daikin Kogyo, Japan) to obtain the 0.2% solution, and this solution was applied to an electrode substrate by a spinner at 3000 r.p.m. followed by a heat treatment at 250° C. for 30 min., and then the coating thus heat-treated was rubbed with a fluffy acetate cotton cloth having a nap length of 2 mm. to one direction. Another electrode substrate was also treated in the same way as above.

The two electrode substrate thus treated were disposed face to face intervened with a spacer of 6μ thick. Then a liquid crystal composition of a negative dielectric anisotropy containing a phenyl cyclohexyl carboxylate nematic liquid crystal (EN-18, tradename, supplied by Chisso, in Japan) was poured into the space defined by the facing transparent electrode substrates as fabricated above. There was obtained a uniform initial orientation, and when a voltage was applied across the two electrodes, a uniform orientation change occurred.

The surrounding of this cell was sealed with an epoxy sealant and allowed to stand at 80° C. for 1000 hours, and any change in orientation and electro-optical characteristics was not observed at all. The result is shown in Table 1, Example 14, (infra).

Following the procedure of Example 14, a silane compound was applied to electrode substrates and a heat treatment under the conditions as shown in Table 1, one of Examples 1-13 and 15 was effected, and then, the cell was formed in a way similar to the above.

Each cell was tested with respect to orientation and durability, and the result was almost good as shown in Table 1.

In Comparison Examples 1-6 in Table 1 below, the above mentioned produre was repeated except that the silane compound film provided on the transparent electrode substrate was heat-treated under the condition as shown in Table 1, Comparison Examples 1-6, and the cell was made in a way as mentioned above. The resulting celles were tested as to orientation and durability. The results are shown in Table 1.

TABLE 1

|  | Temperature (°C.) | Time (min.) | Evaluation of Orientation |
|---|---|---|---|
| Example |  |  |  |
| 1 | 150 | 300 | O |
| 2 | 150 | 180 | Δ |
| 3 | 200 | 100 | O |
| 4 | 200 | 80 | O |
| 5 | 200 | 60 | Δ |
| 6 | 200 | 40 | Δ |
| 7 | 210 | 90 | O |
| 8 | 210 | 60 | Δ |
| 9 | 220 | 90 | O |
| 10 | 220 | 60 | O |
| 11 | 235 | 60 | O |
| 12 | 235 | 30 | Δ |
| 13 | 250 | 60 | O |
| 14 | 250 | 30 | O |
| 15 | 250 | 15 | Δ |
| Comparison Example |  |  |  |
| 1 | 150 | 60 | ▲ |
| 2 | 200 | 30 | ▲ |
| 3 | 200 | 15 | ▲ |
| 4 | 210 | 30 | ▲ |
| 5 | 220 | 30 | ▲ |
| 6 | 235 | 15 | Δ |

Symbol of evalution of orientation:
O Good orientation
Δ Somewhat poor orientation
▲ Insufficient orientation

EXAMPLE 16

A cell was produced by repeating the procedure of Example 1 except that an electrode substrate provided with a switching element made of a-Si in place of the transparent electrode substrate. Good orientation was obtained, and when the cell was driven, a good display function was observed, and in addition, even when allowed to stand for 3 months or more, the orientation performance did not changed.

As is clear from Examples 1-6 above, the electrode substrate produced according to the particular heat treating conditions can give a uniform and stable orientation of liquid crystal. Furthermore, the heat treating is very inexpensive and of high productivity, and therefore, it is suitable for practical use and commercial production.

EXAMPLE 17

A mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$ (FS 116, tradename, supplied by Daikin Kogyo, Japan) was dissolved in a fluorinated carbon solvent to form the 0.2% solution. The solution was applied to a glass substrate provided with a thin film transistor array utilizing amorphous silicon by using a spinner at 3,000 r.p.m., heated at 150°C. at 5 mm Hg for 3 hours, and the surface of the resulting substrate was rubbed with a fluffy acetate cotton cloth having a nap length of 2 mm to one direction.

The surface of a glass substrate having a transparent electrode was subjected to a treatment similar to the above mentioned treatment.

The treated surfaces of the substrates were placed by facing them to each other intervened with a spacer of $6\mu$, and the liquid crystal composition of a negative dielectric anisotropy as used in Example 1 above was poured into the space defined by the substrates and the spacer followed by sealing to obtain a uniform initial orientation.

Then, the switching element of the display device was driven to apply a voltage to the liquid crystal portion, and there was formed a uniform orientation change.

EXAMPLE 18

A display cell was prepared by repeating the procedure of Example 17 except that there was added to the liquid crystal a blue dichroic dye d-5 (supplied by Merck Co.) which was an anthraquinone dye of the formula, and then the operating and non-operating states of the resulting cell were observed through a polarizer plate. The display panel was free from irregularity and had a high contrast.

EXAMPLE 19

A 0.2% solution of a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$ in a fluorinated carbon solvent was applied to each surface of two glass substrates provided with a transparent electrode by using a spinner at 3,000 r.p.m., heated at 100° C. at $10^{-2}$ mm Hg for 2 hours, and rubbed. Then the substrates were made into a cell and a nematic liquid crystal as used in Example 1 to which a blue dichroic dye as used in Example 18 was added was poured into the cell and sealed to fabricate a display device.

Operation and non-operation states of the display device thus fabricated were observed with a polarizer plate and it was found that good orientation change was shown.

COMPARISON EXAMPLE 7

The procedure of Example 19 was repeated except that the heat treatment was carried out at 100° C. for 3 hours in air in place of the conditions in Example 19. And operation and non-operation states were observed. At a non-operation state where no voltage was applied, the degree of light absorption was high. When an operation state continued for more than 5 min., a memory phenomenon occurred partly.

The embodiments in Examples 1-19 above may be effected by using plastics substrates. That is, the oriented film according to the present invention may be formed on a transparent electrode made of a plate or film of polyester resin, polyimide resin, polyacrylonitrile resin and the like to effect an orientation treatment.

Such plastics substrates can be used since the orientation treatment can be effected at a low temperature for a short time, and a high reliability and a long life of orientation can be also obtained.

As are clear from Examples 1-19 above, the advantages of the method of the present invention are as follows.

1. The orientation is stable and uniform.
2. A low temperature treatment method can be employed without adversely thermally affecting the substrates and semiconductors.
3. The semiconductor is not contaminated by impurities.
4. The metal electrode is not adversely affected by oxidation.

Therefore, it is possible to obtain a high quality display device by using a liquid crystal display where a substrate is provided with a function element susceptible to heat or a liquid crystal display where the substrate is not resistive to heat. Furthermore, there can be produced a display device of a high reliability and long life at a low cost by mass production. Therefore, the method and the display device are highly appropriate for commercial purpose.

EXAMPLE 20

To a 10% solution of ETHYL SILICATE 40 (tradename, a mixture of tetramer and hexamer of ethyl orthosilicate, supplied by Nippon Colcoat Chemical Co., Japan) in methanol were added a distilled water in an amount of 5% and hydrochloric acid in an amount of 1.5% of the solution and allowed to stand for one hour.

The resulting mixture was applied to an electrode substrate by using a spinner at 3000 r.p.m. and allowed to stand for drying.

To the resulting coating was applied a 0.2% solution of a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$ (FS 116, tradename, supplied by Daikin Kogyo, Japan) in a fluorinated carbon solvent heat-treated at 250° C. for 30 min., and then the coating thus heat-treated was rubbed with a fluffy acetate cotton cloth having a nap length of 2 mm. to one direction. Another electrode substrate was also treated in the same way as above.

The two transparent electrode substrates thus treated were disposed face to face intervened with a spacer of $6\mu$ thick. Then a liquid crystal of a negative dielectric anisotropy, EN-18 (tradename, supplied by Chisso, in Japan) was poured into the space defined by the facing transparent electrode substrates as fabricated above. There was obtained a uniform initial orientation, and when a voltage was applied across the two electrodes, a uniform orientation change occurred.

The surrounding of this cell was sealed with an epoxy sealant and allowed to stand at 80° C. for 1000 hours, and any change in orientation and electro-optical characteristics was not observed at all.

EXAMPLE 21

A solution of ETHYL SILICATE 40 and $CF_3(CF_2)_3$—Si—$(OCH_3)_3$, $CF_3(CF_2)_4$—Si—$(OCH_3)_3$, $CF_3(CF_2)_5$—Si—$(OCH_3)_3$ and $CF_3(CF_2)_6$—Si—$(OCH_3)_3$ (FS 116, tradename, supplied by Daikin Kogyo, Japan) in a mixture of methanol and a fluorinated carbon solvent was applied to an electrode substrate by a spinner at 3000 r.p.m. followed by a heat treatment at 250° C. for 30 min., and then the coating thus heat-treated was rubbed with a fluffy acetate cotton cloth having a nap length of 2 mm. to one direction. Then, following the procedure of Example 1, a cell was fabricated. The result was similar to that of Example 20.

EXAMPLE 22

The procedures of Example 20 were repeated except that an electrode substrate provided with a switching element of a-Si was used in place of the transparent electrode substrate, and a cell was fabricated.

The following results were found.
1. The orientation is stable and uniform.
2. A low temperature treatment method can be employed without adversely thermally affcting the substrates and semiconductors.
3. The semiconductor is not contaminated by impurities.
4. The metal electrode and the semiconductor are not adversely affected by reactions at electrodes in electro-optical operation of liquid crystal.

We claim:

1. A method for orienting a liquid crystal which comprises bringing a liquid crystal into contact with a heat treated surface of an electrode substrate having a thin film transistor array, provided with a film formed by coating a silane compound having alkoxy and an organic residue having at least a fluorine-substituted hrydrocarbon residue, the heat treatment being effected under the conditions that the heating temperature and the treating time are within the region of a triangle having the vertexes at (1.75, 0), (2.36, 0) and (1.75, 3.15) in a coordinate with 1000x (x reciprocal of absolute temperature on the abscissa and ln k' on the ordinate where k' is the ratio of 300 min. to the treating time(min.).

2. A method according to claim 1 in which the liquid crystal is a nematic liquid crystal.

3. A method according to claim 2 in which the liquid crystal is a nematic liquid crystal of a negative dielectric anisotropy.

4. A method according to claim 1 in which the liquid crystal is oriented perpendicular to the electrode substrate.

5. A method according to claim 1 in which the silane compound is that of the formula (1) below:

where R is alkyl and n is an integer of 1-20.

6. A method according to claim 5 in which R is methyl or ethyl.

7. A method according to claim 5 in which n is an integer of 3-7.

8. A method according to claim 1 in which the silane compound is at least one member selected from the group consisting of $CF_3(CF_2)_3$—Si—$(OCH_3)_3$, $CF_3(CF_2)_4$—Si—$(OCH_3)_3$, $CF_3(CF_2)_5$—Si—$(OCH_3)_3$ and $CF_3(CF_2)_6$—Si—$(OCH_3)_3$.

9. A method according to claim 8 in which the silane compound is a mixture of $CF_3(CF_2)_3$—Si—$(OCH_3)_3$, $CF_3(CF_2)_4$—Si—$(OCH_3)_3$, $CF_3(CF_2)_5$—Si—$(OCH_3)_3$ and $CF_3(CF_2)_6$—Si—$(OCH_3)_3$.

10. A method according to claim 1 in which the substrate is provided with a thin film transistor array of an amorphous silicon semiconductor.

11. A method according to claim 1 in which the heat treated surface is rubbed to one direction.

12. A liquid crystal display device which comprises a liquid crystal sandwiched between an electrode substrate having a thin film transistor array, provided with a film formed by coating a silane compound having alkoxy and an organic residue having at least a flourine-substituted hydrocarbon residue and heat-treated under the conditions that the heating temperature and the treating time are within the region of a triangle having the vertexes at (1.75, 0), (2.36, 0) and (1.75, 3.15) in a coordinate with 1000x (x: reciprocal of absolute temperature) on the abscissa and ln k' on the ordinate where k' is the ratio of 300 min. to the treating time(min.), and a counter substrate provided with a counter electrode.

13. A device according to claim 12 in which the liquid crystal is a nematic liquid crystal of a negative dielectric anisotropy.

14. A device according to claim 12 in which the liquid crystal is a nematic liquid crystal composition of a negative dielectric anisotropy.

15. A device according to claim 12 in which the liquid crystal is in a homeotropic alignment.

16. A device according to claim 12 in which the silane compound is that of the formula (1) below:

$$CF_3(CF_2)_n\text{—Si—}(OR)_3 \qquad (1)$$

where R is alkyl and n is an integer of 1-20.

17. A device according to claim 16 in which R is methyl or ethyl.

18. A device according to claim 16 in which n is an integer of 3-7.

19. A device according to claim 12 in which the silane compound is at least one member selected from the group consisting of $CF_3(CF_2)_3$—Si$(OCH_3)_3$, $CF_3(CF_2)_4$—Si$(OCH_3)_3$, $CF_3(CF_2)_5$—Si—$(OCH_3)_3$ and $CF_3(CF_2)_6$—Si—$(OCH_3)_3$.

20. A device according to claim 12 in which the silane compound is a mixture of $CF_3(CF_2)_3$—Si—$(OCH_3)_3$, $CF_3(CF_2)_4$—Si—$(OCH_3)_3$, $CF_3(CF_2)_5$—Si—$(OCH_3)_3$ and $CF_3(CF_2)_6$—Si—$(OCH_3)_3$.

21. A device according to claim 12 in which one of the electrode substrares is provided with a thin film transistor array of an amorphous silicon semiconductor.

22. A device according to claim 12 in which the liquid crystal is in a homeotropic alignment with a uniform tilting direction.

23. A device according to claim 21 in which the surface of the electrode substrate provided with a switching array of an amorphous silicon semiconductor is rubbed to one direction.

24. A device according to claim 12 in which the substrate constituting the electrode substrate is glass or plastics.

25. A method for orienting a liquid crystal in a homeotropic alignment with a uniform tilting direction which comprises applying a silane compound having alkoxy and an organic residue having at least a fluorine-substituted hydrocarbon residue to an electrode substrate having a thin film transistor array, heat-treating the coated silane compound under vacuum, and bringing a liquid crystal into contact with the rubbed surface of the silane compound coating thus heat-treated.

26. A method according to claim 25 in which the liquid crystal is a nematic liquid crystal.

27. A method according to claim 26 in which the liquid crystal is a nematic liquid crystal of a negative dielectric anisotropy.

28. A method according to claim 25 in which the liquid crystal is oriented perpendicular to the electrode substrate.

29. A method according to claim 25 in which the silane compound is that of the formula (1) below:

$$CF_3(CF_2)_n-Si(OR)_3 \quad (1)$$

where R is alkyl and n is an integer of 1-20.

30. A method according to claim 29 in which R is methyl or ethyl.

31. A method according to claim 29 in which n is an integer of 3-7.

32. A method according to claim 25 in which the silane compound is at least one member selected from the group consisting of $CF_3(CF_2)_3-Si(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

33. A method according to claim 32 in which the silane compound is a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

34. A method according to claim 25 in which the electrode substrate is provided with a thin film transistor array of an amorphous silicon semiconductor.

35. A method according to claim 25 in which the heating in vacuum is effected at a temperature of from 60° C. to 200° C.

36. A method according to claim 25 in which the heating under vacuum is effected at a pressure of from $10^{-2}$ mmHg to 10 mmHg.

37. A method according to claim 2 in which the heating in vacuum is effected at 60° C.–200° C. at $10^{-2}$ mmHg–10 mmHg for 10 min.–3 hours.

38. A liquid crystal display device which comprises a liquid crystal in a homeotropic alignment with a uniform tilting direction sandwiched between an electrode substrate having a thin film transistor array, provided with a film formed by coating a silane compound having alkoxy and an organic residue having at least a fluorine-substituted hydrocarbon residue, heating under vacuum and rubbing the heat-treated surface, and a counter substrate provided with a counter electrode.

39. A device according to claim 38 in which the liquid crystal is a nematic liquid crystal of a negative dielectric anisotropy.

40. A device according to claim 38 in which the liquid crystal is a nematic liquid crystal composition of a negative dielectric anisotropy.

41. A device according to claim 38 in which the liquid crystal is in a homeotropic alignment.

42. A device according to claim 38 in which the silane compound is that of the formula (1) below:

$$CF_3(CF_2)_n-Si(OR)_3 \quad (1)$$

where R is alkyl and n is an integer of 1-20.

43. A device according to claim 42 in which R is methyl or ethyl.

44. A device according to claim 42 in which n is an integer of 3-7.

45. A device according to claim 38 in which the silane compound is at least one member selected from the group consisting of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

46. A device according to claim 45 in which the silane compound is a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

47. A device according to claim 38 in which one of the electrode substrate is provided with a thin film transistor array of an amorphous silicon semiconductor.

48. A device according to claim 47 in which the surface of the electrode substrate provided with a switching array of an amorphous silicon semiconductor is rubbed to one direction.

49. A device according to claim 38 in which the substrate constituting the electrode substrate is glass or plastics.

50. A method for orienting a liquid crystal which comprises bringing a liquid crystal into contact with the surface of a film comprising a layer of a silane compound having alkoxy and an organic residue having at least a fluorine-substituted hydrocarbon residue overlying a layer of a condensate of several molecules of alkyl orthosilicate in a straight chain form or a branched chain form which overlies an electrode substrate, or the surface of a film compound of a mixture of the condensates of several molecules of alkyl orthosilicate in a straight chain form or a branched chain form and said silane compound overlying an electrode substrate.

51. A method according to claim 50 in which said condensate of several molecules of alkyl orthosilicate in a straight chain form or a branched chain form is tetramer or hexamer of ethyl orthosilicate.

52. A method according to claim 50 in which the silane compound is that of the formula (1) below:

$$CF_3(CF_2)_n-Si(OR)_3 \quad (1)$$

where R is alkyl and n is an integer of 1-20.

53. A method according to claim 52 in which R is methyl or ethyl.

54. A method according to claim 52 in which n is an integer of 3-7.

55. A method according to claim 50 in which the silane compound is at least one member selected from the group consisting of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

56. A method according to claim 55 in which the silane compound is a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

57. A method according to claim 50 in which the liquid crystal is a nematic liquid crystal.

58. A method according to claim 57 in which the liquid crystal is a nematic liquid crystal of a negative dielectric anisotropy.

59. A method according to claim 50 in which the liquid crystal is a nematic liquid crystal containing a dichroic dye.

60. A method according to claim 50 in which the liquid crystal is oriented perpendicular to the electrode substrate.

61. A method according to claim 50 in which the electrode substrate is provided with a switching array of an amorphous silicon semiconductor.

62. A method according to claim 50 in which the surface of the electrode substrate to be contacted with the liquid crystal is rubbed.

63. A liquid crystal display device which comprises a liquid crystal sandwiched between an electrode substrate having a film comprising a layer of a silane compound having alkoxy and an organic residue having at least a fluorine-substituted hydrocarbon residue overlying a layer of a condensate of several molecules of alkyl orthosilicate in a straight chain form or a branched chain form which overlies the electrode substrate,
or a film composed of a mixture of the condensates of several molecules of alkyl orthosilicate in a straight chain form or a branched chain form and said silane compound overlying the electrode substrate,
and a counter substrate having a counter electrode.

64. A device according to claim 63 in which the liquid crystal is a nematic liquid crystal having a negative dielectric anisotropy.

65. A device according to claim 63 in which the liquid crystal is a nematic liquid crystal composition of a negative dielectric anisotropy.

66. A device according to claim 63 in which the liquid crystal is a nematic liquid crystal containing a dichroic dye.

67. A device according to claim 63 in which said condensate of several molecules of alkyl orthosilicate in a straight chain form or a branched chain form is tetramer or hexamer of ethyl orthosilicate.

68. A device according to claim 63 in which the silane compound is that of the formula (1) below:

$$CF_3(CF_2)_n-Si(OR)_3 \tag{1}$$

where R is alkyl and n is an integer of 1–20.

69. A device according to claim 68 in which R is methyl or ethyl.

70. A device according to claim 68 in which n is an integer of 3–7.

71. A device according to claim 63 in which the silane compound is at least one member selected from the group consisting of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

72. A device according to claim 71 in which the silane compound is a mixture of $CF_3(CF_2)_3-Si-(OCH_3)_3$, $CF_3(CF_2)_4-Si-(OCH_3)_3$, $CF_3(CF_2)_5-Si-(OCH_3)_3$ and $CF_3(CF_2)_6-Si-(OCH_3)_3$.

73. A device according to claim 63 in which one of the electrode substrates is provided with a switching array of an amorphous silicon semiconductor.

74. A device according to claim 63 in which the liquid crystal is in a homeotropic alignment with a uniform tilting direction.

75. A device according to claim 74 in which the surface of the electrode substrate provided with a switching array of an amorphous silicon semiconductor is rubbed to one direction.

76. A device according to claim 63 in which the substrate constituting the electrode substrate is glass or plastics.

77. A device according to claim 12 or claim 38 in which the device is a guest-host type liquid crystal display device.

* * * * *

UNITED STATES PATENT AND TRADEMARK OFFICE
CERTIFICATE OF CORRECTION

PATENT NO. : 4,472,027

DATED : September 18, 1984

INVENTOR(S) : YUKITOSHI OKUBO, ET AL

Page 1 of 3

It is certified that error appears in the above-identified patent and that said Letters Patent is hereby corrected as shown below:

On the title page add Foreign Application Priority Data

-- Dec. 26, 1980     Japan          55-187162 --.

Abstract, 1st page          change "(x being the reciprocal" to -- (reciprocal --

Column 1, line 61, change "haing" to -- having --

Column 2, line 34, change "(2,5 0)" to -- (2.5, 0) --

Column 3, line 11, change "(infra)" to -- (infra) --

Column 4, line 4, change "n" to -- $\underline{n}$ --

Column 4, line 14, change "contacing" to -- contacting --

Column 5, line 45, change "n" to -- $\underline{n}$ --

Column 6, line 3, change "$CF_3$ $F_3$" to -- $CF_3$ $F_2$ --

Column 6, line 2, change ",$3H_2O$" to -- $3H_2O$ --

Column 6, Raise second column of formula to parallel first column

Column 6, line 13, change "Si-O-Si-O-Si" to -- ---Si-O-Si-O-Si--- --

UNITED STATES PATENT AND TRADEMARK OFFICE
CERTIFICATE OF CORRECTION

PATENT NO. : 4,472,027                                    Page 2 of 3
DATED      : September 18, 1984
INVENTOR(S): YUKITOSHI OKUBO, ET AL It is certified that error appears in the above-identified patent and that said Letters Patent is hereby corrected as shown below:

Column 6, line 25, change "Si-O-Si-O-Si" to --
    -- ---Si-O-Si-O-Si--- --
Column 6, line 46, in formula, change, "lna" to -- na --
Column 6, line 48, change "a" to -- a --
Column 6, line 57, in formula, change "lna" -- to -- na --
Column 7, line 24, change "preferably" to -- preferable --
Column 7, line 25, change "oa" to -- to --
Column 7, line 46, change "tolarable" to -- tolerable --
Column 8, line 5, change "cotten" to -- cotton --
Column 10, line 38, change "in" to -- at --
Column 11, line 27, change "films" to -- film --
Column 11, line 30, change "still" to -- Still --
Column 12, line 7, change "(infra)" to -- (infra) --
Column 12, line 17, change "produre" to -- procedure --
Column 12, line 22, change "celles" to -- cells --
Column 12, line 47, change "evalution" to -- evaluation --
Column 12, line 61, change "changed" to -- change --
Column 13, line 33, change "d-5" to -- D-5 --

UNITED STATES PATENT AND TRADEMARK OFFICE
CERTIFICATE OF CORRECTION

PATENT NO. : 4,472,027

DATED : September 18, 1984

INVENTOR(S) : YUKITOSHI OKUBO, ET AL

It is certified that error appears in the above-identified patent and that said Letters Patent is hereby corrected as shown below:

Column 15, line 30, change "affcting" to -- affecting --

Column 15, lines 43-44, change "hrydrocarbon" to
    -- hydrocarbon --

Column 15, line 48, change "1000 x (x reciprocal" to
    -- 1000x (x; reciprocal --

Column 16, line 57, change "substrares" to -- substrates --

Column 17, line 47, change "claim 2" to -- claim 25 --

Signed and Sealed this

Twenty-third Day of April 1985

[SEAL]

Attest:

DONALD J. QUIGG

Attesting Officer

Acting Commissioner of Patents and Trademarks